US012088391B2

(12) United States Patent
Kim et al.

(10) Patent No.: US 12,088,391 B2
(45) Date of Patent: Sep. 10, 2024

(54) METHOD AND APPARATUS FOR BEAM MANAGEMENT IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 185 days.

(21) Appl. No.: 17/939,087

(22) Filed: Sep. 7, 2022

(65) Prior Publication Data

US 2023/0081368 A1  Mar. 16, 2023

(30) Foreign Application Priority Data

Sep. 10, 2021 (KR) .......................... 10-2021-0121052
Sep. 6, 2022 (KR) .......................... 10-2022-0112778

(51) Int. Cl.
*H04B 7/08* (2006.01)
(52) U.S. Cl.
CPC ..................... *H04B 7/08* (2013.01)
(58) Field of Classification Search
CPC ... H04B 7/08; H04B 7/06968; H04B 7/06956
USPC ........................................................ 375/267
See application file for complete search history.

(56) References Cited

U.S. PATENT DOCUMENTS

| | | | |
|---|---|---|---|
| 10,873,866 B2 | 12/2020 | Kim | |
| 10,999,036 B2 | 5/2021 | Kim | |
| 11,115,973 B2 | 9/2021 | Jin et al. | |
| 2021/0105860 A1 | 4/2021 | Tsai et al. | |
| 2021/0112540 A1 | 4/2021 | Zewail et al. | |
| 2021/0168779 A1 | 6/2021 | Mondal et al. | |
| 2021/0184738 A1 | 6/2021 | Bai et al. | |
| 2021/0274372 A1 | 9/2021 | Shi et al. | |
| 2022/0006539 A1* | 1/2022 | Sun | H04B 7/0802 |
| 2022/0086715 A1* | 3/2022 | Hong | H04W 36/249 |

FOREIGN PATENT DOCUMENTS

WO  2017/023231 A1  2/2017

* cited by examiner

*Primary Examiner* — Fitwi Y Hailegiorgis
(74) *Attorney, Agent, or Firm* — Rabin & Berdo, P.C.

(57) ABSTRACT

A method of a terminal may comprise: receiving, from a base station, DCI including downlink scheduling information and information indicating that a beam adjustment period exists; receiving, from the base station, an initial signal in the beam adjustment period; adjusting a Rx beam of the terminal based on a measurement result of the initial signal; and receiving, from the base station, data by using the adjusted Rx beam in a resource region indicated by the downlink scheduling information.

20 Claims, 5 Drawing Sheets

METHOD AND APPARATUS FOR BEAM MANAGEMENT IN COMMUNICATION SYSTEM

CROSS-REFERENCE TO RELATED APPLICATIONS

This application claims priority to Korean Patent Applications No. 10-2021-0121052 filed on Sep. 10, 2021, and No. 10-2022-0112778 filed on Sep. 6, 2022 with the Korean Intellectual Property Office (KIPO), the entire contents of which are hereby incorporated by reference.

BACKGROUND

1. Technical Field

The present disclosure relates to a communication technique, and more specifically, to a technique for loose beam management.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, in order to increase a coverage area of channels and/or signals, a narrow beam may be used. In this case, an optimal link (e.g., a pair of a transmission (Tx) beam and a reception (Rx) beam) between a terminal and a base station may be changed by movement of the terminal. When the optimal link is changed, a communication quality between the terminal and the base station may be deteriorated. Therefore, a method to solve these problems is needed.

SUMMARY

Accordingly, exemplary embodiments of the present disclosure are directed to providing a method and an apparatus for beam management in a communication system.

According to a first exemplary embodiment of the present disclosure, a method of a terminal may comprise: receiving, from a base station, downlink control information (DCI) including downlink scheduling information and information indicating that a beam adjustment period exists; receiving, from the base station, an initial signal in the beam adjustment period; adjusting a reception (Rx) beam of the terminal based on a measurement result of the initial signal; and receiving, from the base station, data by using the adjusted Rx beam in a resource region indicated by the downlink scheduling information.

The method may further comprise: receiving, from the base station, configuration information of the beam adjustment period, wherein the configuration information indicates at least one of a position or a size of the beam adjustment period.

The beam adjustment period may be located before the resource region in time domain, and a last symbol in which the initial signal is received may not be contiguous with a first symbol of the resource region.

The beam adjustment period may be located before the resource region in time domain, a last symbol in which the initial signal is transmitted may be contiguous with a first symbol of the resource region, and the terminal may not receive the initial signal in an interval including the last symbol.

A subcarrier spacing of a resource in which the initial signal is received may be larger than a subcarrier spacing of the resource region.

An antenna port of the initial signal may be associated with an antenna port of a demodulation-reference signal (DM-RS) or a phase tracking (PT)-RS.

The initial signal may be received through similar Rx beams of the terminal, and the similar Rx beams may be derived based on a transmission configuration indication (TCI) state index included in the DCI.

The method may further comprise: receiving, from the base station, information indicating a number of Rx beams available for reception of the initial signal.

According to a second exemplary embodiment of the present disclosure, a method of a terminal may comprise: receiving, from a base station, downlink control information (DCI) including uplink scheduling information and information indicating that a beam adjustment period exists; transmitting, to the base station, an initial signal in the beam adjustment period; and transmitting, to the base station, data in a resource region indicated by the uplink scheduling information, wherein the initial signal is used for adjusting a reception (Rx) beam of the base station.

The method may further comprise: receiving, from the base station, configuration information of the beam adjustment period, wherein the configuration information indicates at least one of a position or a size of the beam adjustment period.

The beam adjustment period may be located before the resource region in time domain, and a last symbol in which the initial signal is transmitted may not be contiguous with a first symbol of the resource region.

The beam adjustment period may be located before the resource region in time domain, and a last symbol in which the initial signal is transmitted may be contiguous with a first symbol of the resource region.

A subcarrier spacing of a resource in which the initial signal is transmitted may be larger than a subcarrier spacing of the resource region.

An antenna port of the initial signal may be associated with an antenna port of a demodulation-reference signal (DM-RS) or a phase tracking (PT)-RS.

According to a third exemplary embodiment of the present disclosure, a method of a base station may comprise: transmitting, to a terminal, downlink control information (DCI) including uplink scheduling information and information indicating that a beam adjustment period exists; receiving, from the terminal, an initial signal in the beam adjustment period; adjusting a reception (Rx) beam of the base station based on a measurement result of the initial signal; and receiving, from the terminal, data by using the adjusted Rx beam in a resource region indicated by the uplink scheduling information.

The method may further comprise: transmitting, to the terminal, configuration information of the beam adjustment period, wherein the configuration information indicates at least one of a position or a size of the beam adjustment period.

The beam adjustment period may be located before the resource region in time domain, and a last symbol in which the initial signal is received may not be contiguous with a first symbol of the resource region.

The beam adjustment period may be located before the resource region in time domain, and a last symbol in which the initial signal is transmitted may be contiguous with a first symbol of the resource region.

An antenna port of the initial signal may be associated with an antenna port of a demodulation-reference signal (DM-RS) or a phase tracking (PT)-RS.

The initial beam may be received through similar Rx beams of the base station.

According to the present disclosure, in a downlink communication procedure, a base station may transmit an initial signal in a beam adjustment period, and then transmit data. A terminal may adjust a Rx beam based on a measurement result of the initial signal received in the beam adjustment period, and may receive the data using the adjusted Rx beam. In an uplink communication procedure, the terminal may transmit an initial signal in a beam adjustment period, and then transmit data. The base station may adjust a Rx beam based on a measurement result of the initial signal received in the beam adjustment period, and may receive the data using the adjusted Rx beam. According to the above-described operations, a data reception performance in the base station or the terminal can be improved, and thus the performance of the communication system may be improved.

DETAILED DESCRIPTION OF THE EMBODIMENTS

Figure 1:
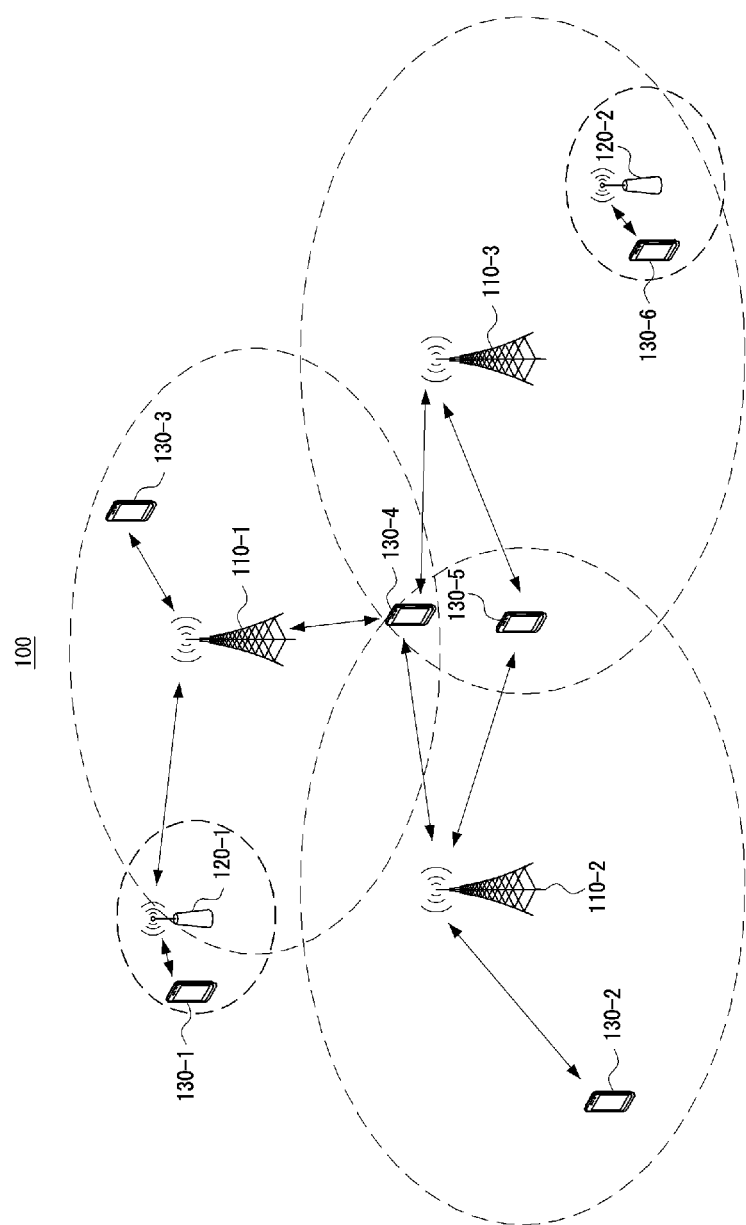
FIG. 1 is a conceptual diagram illustrating a first exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems.

Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
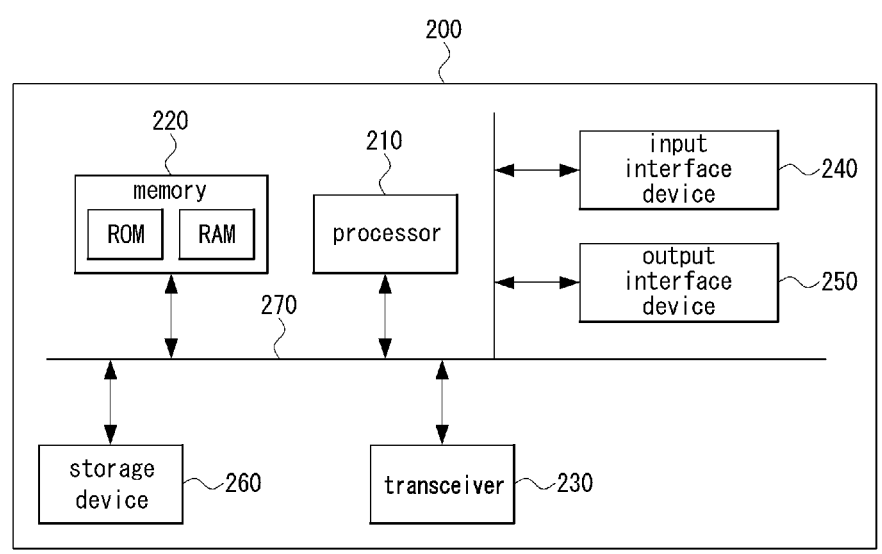
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

A scenario to which communication is applied may be an Enhanced Mobile BroadBand (eMBB) scenario, a massive Machine-Type Communication (mMTC) scenario, an Ultra-Reliable and Low Latency Communication (URLLC) scenario, and/or a Time Sensitive Communication (TSC) scenario. The mMTC scenario, URLLC scenario, and/or TSC scenario may be applied in Internet of Things (IoT) communication. One communication network (e.g., one communication system) may support all of the above-mentioned scenarios or some of the above-mentioned scenarios. In a communication network supporting the mMTC scenario, IMT-2020 requirements can be satisfied using narrowband (NB)-IoT and LTE-MTC technologies. A lot of discussions may be needed for a communication system supporting the URLLC scenario to satisfy the requirements.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic, a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or a DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG).

In order to support URLLC traffic, it may be preferable for the terminal to perform frequent reception operations in downlink (DL) resources and/or frequent transmission operations in uplink (UL) resources. In a time division duplex (TDD) system, the terminal may operate based on a half-duplex scheme. Accordingly, a time of supporting DL traffic and/or UL traffic may increase according to a slot pattern. On the other hand, in a frequency division duplex (FDD) system, the terminal may utilize DL resources and UL resources at the same time. Accordingly, the above-described problem in the TDD system may not occur in the FDD system. The FDD system may use two or more carriers. When two or more serving cells are configured to the terminal in the TDD system, the terminal may utilize DL resources and UL resources.

In a communication system including at least one carrier to which the FDD is applied (hereinafter, referred to as 'FDD carrier'), there may be no problem with respect to a latency of the terminal. In a communication system including only carrier(s) to which the TDD is applied (hereinafter, referred to as 'TDD carrier(s)'), there may be a problem with respect to a latency of the terminal. In order to solve the above problem, slots in the TDD carriers may be configured according to different patterns.

Carrier aggregation (CA) may be configured in the terminal, and a PCell and SCell(s) may be activated. Depending on whether a common search space (CSS) set is included, a cell may be classified into a PCell or an SCell. For example, the PCell may include a CSS set, and the SCell may not include a CSS set. In order to reduce a latency in a communication system supporting URLLC traffic, slots having different patterns may be configured and/or indicated to the terminal.

Since a latency occurs when the URLLC traffic is repeatedly transmitted, it may not be appropriate to repeatedly transmit the URLLC traffic. However, when a sufficiently low MCS is used, a latency for decoding the URLLC traffic may be reduced. That is, when a sufficiently low MCS is used, the number of resource elements (REs) to which the URLLC traffic is mapped may increase, and the base station (e.g., a decoder of the base station) should wait until all the REs are received. In this case, the latency for decoding the URLLC traffic may be reduced.

However, when a PUSCH to which a rather high MCS is applied is repeatedly transmitted, the base station may perform the decoding only with some REs. Therefore, a timing at which decoding is successful in the repeated PUSCH transmission (e.g., repeated transmission of the PUSCH to which a somewhat high MCS is applied) may be earlier than a timing at which decoding is successful in the non-repeated PUSCH transmission (e.g., transmission of the PUSCH to which a low MCS is applied). When the PUSCH repetition type A is used, an unnecessary latency may occur, and a PUSCH repetition type B may be introduced to reduce the latency due to the repeated transmission. When the PUSCH repetition type B is used, a PUSCH allocated on a mini-slot basis may be repeatedly transmitted. When the PUSCH repetition type B is used, a time resource may be configured by an RRC message and/or a DCI. A combination of a reference time resource of a PUSCH instance and the number of repeated transmissions may be indicated by the DCI (e.g., in case of Type 2 CG and/or dynamic grant) or the RRC message (e.g., in case of Type 1 CG).

In order to control a transmission power of a sounding reference signal (SRS) resource indicated by an SRS resource indicator (SRI), the base station may estimate a path loss for each SRS resource. The base station may control a transmission power of SRS resource(s) by using DCI. The transmission power of the SRS resource(s) may be controlled based on the estimated path loss. The DCI may be a scheduling DCI (e.g., DCI format 0_0, DCI format 0_1, DCI format 0_2, DCI format 1_0, DCI format 1_1, or DCI format 1_2) or a group common (GC)-DCI (e.g., DCI format 2_2 or DCI format 2_3). The DCI may include a field indicating a transmit power control (TPC) command, and the TPC command may be used to control a transmission power of the terminal. For example, the transmission power of the terminal may be increased or decreased based on the TPC command included in the DCI. In order to determine a transmission power of a PUSCH, the terminal may consider a value obtained based on a path loss, a value according to the TPC command included in the DCI, and/or a PUSCH bandwidth indicated by the DCI.

The base station may configure two or more sets to the terminal using higher layer signaling. The terminal may receive configuration information of the two or more sets from the base station. Element(s) constituting each of the two or more sets may be transmission power parameter(s), and may be indicated to be suitable for different scenarios (e.g., URLLC scenario, eMBB scenario). The terminal may receive a scheduling DCI or an activating DCI for allocating a PUSCH resource from the base station, and the scheduling DCI or the activating DCI may indicate a set for interpreting transmission power parameter(s). When a set of transmission power parameter(s) is different, a magnitude of increasing or decreasing the transmission power indicated by the same TPC command may be different.

When Type 1 CG or Type 2 CG is used, a transmission power may be determined based on a DCI format 2_3 for an SRI associated with a PUSCH instance. When Type 2 CG is used, an activating DCI may indicate a set of transmission power parameter(s) applied to a PUSCH occasion. The PUSCH occasion may mean a PUSCH instance. The terminal may obtain a TPC command for an SRI by receiving a GC-DCI, and may interpret the TPC command to be suitable to the set of transmission power parameter(s) indicated by the base station, and may derive a transmission power to be applied to the PUSCH instance based on a result of the interpretation.

In transmitting a dynamically-scheduled PUSCH, the terminal may derive a transmission power applied to a PUSCH instance based on a combination of a GC-DCI and a scheduling DCI. By receiving the GC-DCI, the terminal may identify a TCP command of an SRI and store the identified TCP command. In transmitting a dynamically-scheduled PUSCH, a set of transmission power parameter(s) and/or a TPC command applied to a PUSCH occasion may be indicated by a scheduling DCI. The terminal may derive a transmission power to be applied to a PUSCH instance based on a transmission power of an SRI associated with the PUSCH instance.

Repeated HARQ-ACK transmission may be indicated (or configured) by higher layer signaling for each physical uplink control channel (PUCCH) format. The number of repeated transmissions for a PUCCH format i may be independently set. i may be 0, 1, 2, 3, or 4. The terminal may repeatedly transmit a PUCCH format through slots. In this case, the PUCCH format may be transmitted using the same time resource in the respective slots.

The type of uplink control information (UCI) may be classified according to a type of information included in the UCI. The UCI may include at least one of a scheduling request (SR), L1-reference signal received power (L1-RSRP), HARQ-ACK, channel state information (CSI), or combinations thereof. In exemplary embodiments, UCI and UCI type may be used with the same meaning. In a repeated transmission operation of UCI, only one UCI type may be transmitted. In order to support this operation, a priority of each UCI type may be defined in the technical specification. One UCI type may be selected, and a PUCCH including the one UCI type may be repeatedly transmitted. In this case, the terminal may assume that no other UCI type is transmitted before the transmission of the corresponding UCI type is completed. In order to support this operation, the base station may instruct the terminal to transmit UCI (e.g., SR or HARQ-ACK) after transmission of the corresponding PUCCH is completed. A waiting time for the UCI transmission may be large, and the waiting time may act as a constraint on scheduling of the base station.

When it is indicated to transmit HARQ-ACKs in the same slot (or the same subslot) or when PUCCH time resources indicated by DCI(s) and/or RRC message(s) for allocating physical downlink shared channel(s) (PDSCH(s)) overlap each other, the terminal may generate a HARQ codebook so as to be transmitted on one PUCCH (e.g., one PUCCH time resource). In the HARQ codebook, HARQ-ACK bits may be arranged according to an order defined in the technical specification. Information bits may be generated by the above-described operation. The terminal may generate coded bits by performing an encoding operation thereon.

In the encoding operation, a Reed-Müller code or a polar code may be used. A code rate applied in the encoding operation may be indicated by higher layer signaling. For example, one value in the PUCCH format may be the code rate and may be indicated to the terminal.

One codeword may be mapped to one PUCCH. In a repeated PUCCH transmission operation, one UCI type may be generated as a codeword. When a PUCCH is transmitted once, information bits of one UCI type or two or more UCI types may be concatenated, and the terminal may generate one codeword by performing the same encoding operation on the information bits. When a Reed-Müller code or a polar code is used, it may be difficult to implement a soft combining operation. Accordingly, even when the PUCCH is repeatedly transmitted, the same codewords may be transmitted, and the base station may perform a chase combining operation on the same codewords. The coded bit or codeword may mean a bit stream in which a plurality of code blocks are concatenated. A modulation operation may be performed on the codeword, and a result of the modulation operation may be mapped to resource elements (REs).

Meanwhile, the same UCI types may be regarded as different information. The same UCI types considered as different information may be mapped. For example, UCIs may be generated to support traffic having different priorities. A UCI (e.g., SR or HARQ-ACK) supporting eMBB traffic may be regarded as information different from a UCI (e.g., SR or HARQ-ACK) supporting URLLC traffic. In this case, even when the UCI types are the same, they may be distinguished as different information.

The coded UCI may be mapped to a PUCCH. In a PUCCH transmission operation, the same preprocessing scheme (e.g., spatial information, spatial relation) may be maintained. Alternatively, in the PUCCH transmission operation, use of a different preprocessing scheme for each PUCCH may be allowed by RRC signaling of the base station.

In exemplary embodiments, two or more terminals may receive data from one or more TRPs, and may transmit data to one or more TRPs. It may be assumed that one base station or one server performs a management operation and/or a scheduling operation for one or more TRPs among a plurality of TRPs. The TRPs may be directly connected with each other. Alternatively, the TRPs may be connected through the base station. The above-described connections may be connections according to Xn interfaces or wireless interfaces (e.g., interfaces of the 3GPP NR).

A shadow area may occur between areas supported by the TRPs. Therefore, the TRPs may resolve the shadow area through cooperative transmissions. The cooperative transmissions may be performed for a terminal located between the TRPs. Even when a shadow area does not occur, a quality of radio links may be improved by installing many TRPs (or base stations) to transmit and receive a lot of data.

According to a cooperative transmission and a cooperative reception of the TRPs, a communication scheme may be classified into dynamic point selection (DPS) and joint transmission (JT). For a specific physical resource block (PRB) set, the DPS may be a scheme of receiving data through one TRP, and the JT may be a scheme of receiving data through two or more TRPs. A dynamic point blanking (DPB) scheme may be a type of the JT. When the DPB is used, the terminal may not receive data from some TRPs and may receive data from the remaining TRPs. The JT may be classified into coherent JP and noncoherent JP. Depending on whether a coherent combining operation is performed on signals received from TRPs, the coherent JP or the non-coherent JP may be used.

When synchronization between TRPs is acquired and a CSI report is shared between the TRPs, a performance gain may occur by a coherent combining operation performed in the terminal. When the above-described condition(s) is not satisfied, it may be advantageous in terms of performance that a non-coherent combining operation is performed in the terminal.

When the terminal is mounted on a vehicle, restrictions on the size and/or weight of the terminal may be small. For a terminal directly used by a person, portability may be considered.

Chapter 1 Beam Management 1.1 Method of Classifying Reception (Rx) Beams of Reference Signals (RSs) to be Similar A terminal may communicate with one or more TRPs. The terminal may communicate with one TRP in order to transmit and receive eMBB traffic. The terminal may communicate with two or more TRPs in order to transmit and receive URLLC traffic. Each of the above-described TRPs may support one or more traffic types. For example, the TRP may support eMBB traffic, URLLC traffic, or both eMBB traffic and URLLC traffic. The terminal may support the same type of traffic (e.g., eMBB traffic or URLLC traffic) or different types of traffic (e.g., eMBB traffic and URLLC traffic) according to configuration indicated by a scheduling DCI and/or RRC signaling. The same type of traffic may be eMBB traffic or URLLC traffic. The same type of traffics may have different quality of service (QoS). For example, traffic derived from an XR service may be classified into traffic having I-frame and traffic having P-frame, and the traffic having I-frame and the traffic having P-frame may have different QoS. The traffics having different QoS may be mapped to different data radio bearers (DRBs). The base station and/or the terminal may support the above-described operation.

The terminal may communicate with three TRPs. The three TRPs may be connected to one or more base stations. The terminal may have one or more panels (e.g., antenna panels, Tx panel, Rx panel). eMBB traffic may be transmitted/received in a low frequency band (e.g., FR1), and URLLC traffic may be transmitted/received in a high frequency band (e.g., FR2) as well as a low frequency band (e.g., FR1). Because a wide bandwidth is required to support URLLC traffic, URLLC traffic may not be supported in FR1 depending on frequency distribution. Since FR2 has a wide bandwidth, URLLC traffic may be supported in FR2 when a channel state of the TRP is good. Because a blockage occurs frequently in FR2, it may be preferable to use multiple TRPs. For example, three TRPs may support URLLC traffic.

The terminal may have a plurality of Tx panels and a plurality of Rx panels. The number of panels (e.g., Tx panels and/or Rx panels) used in the terminal may be indicated or set by explicit signaling or implicit signaling. For example, scheduling information (e.g., DCI) may indicate to the terminal an index of a Rx beam for reception of a PDSCH. Scheduling information (e.g., DCI) may indicate to the terminal an index of a Tx beam for transmission of a PUSCH. The terminal may use a plurality of panels to generate Rx beam(s) or Tx beam(s). In exemplary embodiments, a panel may mean a Rx panel, a Tx panel, and/or an antenna panel.

The base station may transmit scheduling information indicating to perform a transmission operation using a plurality of Tx beams simultaneously (e.g., a frequency division multiplexing (FDM)-based transmission operation or a spatial division multiplexing (SDM)-based transmission operation) to the terminal. The base station may transmit scheduling information indicating to perform a reception operation using a plurality of Rx beams simultaneously (e.g., an FDM-based reception operation or an SDM-based reception operation) to the terminal. The number of beams simultaneously used in the transmission operation or the reception operation may correspond to the minimum number of panels simultaneously used by the terminal. The reason is that in general, when the terminal forms a beam, one beam is generated from each panel. When two or more beams are generated from one panel, the number of beams may be greater than the number of panels.

Method 1.1-1: The terminal may report to the base station capability information including information indicating the maximum number of Tx beams and/or the maximum number of Rx beams that can be simultaneously processed (e.g., can be used at the same time) to the base station.

Each of the maximum number of Tx beams and the maximum number of Rx beams may be expressed as an independent parameter, and the corresponding parameter may be included in RRC signaling. A combination of the maximum number of Tx beams and the maximum number of Rx beams may be expressed as one parameter, and the corresponding parameter may be included in RRC signaling.

A reference signal may be transmitted/received through a beam (e.g., Tx beam and/or Rx beam) and/or a panel (e.g., Tx panel and/or Rx panel). In exemplary embodiments, an operation related to a Tx beam may be interpreted as an operation related to a Tx panel, and an operation related to a Tx panel may be interpreted as an operation related to a Tx beam. In exemplary embodiments, an operation related to a Rx beam may be interpreted as an operation related to a Rx panel, and an operation related to a Rx panel may be interpreted as an operation related to a Rx beam. Reference signals related to a common beam may be interpreted as belonging to the same RS group (or RS list).

When the terminal transmits and receives at least two or more beams at the same time, the base station may indicate or configure a RS group to the terminal. Alternatively, the terminal may implicitly derive a RS group using higher layer signaling (e.g., RRC signaling and/or MAC signaling).

A method of configuring or indicating a RS group to the terminal may be variously performed. A resource configuration for receiving a RS may be separated from a report configuration for reporting a measurement result of the RS. The base station may indicate or configure the resource configuration and the report configuration to the terminal. The resource configuration and/or report configuration transmitted to the terminal may include information (e.g., information element(s)) on the RS group. Alternatively, the information on the RS group may be known to the terminal through a separate configuration.

Method 1.1-2: The RS group may include RS indexes (e.g., SSB indexes, CSI-RS IDs), and may be configured to the terminal together with an identifier of the RS group.

Method 1.1-3: The RS group may be indicated to the terminal through information (e.g., resource configuration) for configuring RS(s). The resource configuration may include an identifier of the RS group.

Method 1.1-4: The RS group may be indicated to the terminal through information (e.g., report configuration) for configuring a report. The report configuration may include an identifier of the RS group and/or RS index(es).

When Method 1.1-2 is applied, configuration of the RS group may be independent information, and may be distinguished from the resource configuration and the report configuration. The configuration of the RS group may be transmitted to the terminal.

The RS group may be explicitly configured to the terminal. Alternatively, the terminal may derive the RS group in an implicit manner. In this case, the RS group may be a concept for easily describing operations of the terminal, and the RS group may be expressed in other terms in the technical specification.

The information for configuring RS(s) (e.g., resource configuration) may include quasi-co-location (QCL) information. The QCL information may be classified into QCL-Type1 and QCL-Type2. In a communication system operating in FR2, QCL-Type2 may be included in the information configuring RS(s). Depending on an implementation, QCL-Type2 may not be included in the information for configuring RS(s). In a communication system operating in FR1 and/or FR2, QCL-Type1 may be included in the information configuring RS(s).

RS s belonging to the RS group may have similar beams. For example, RS s belonging to the same RS group may be classified into a RS type having similar beams.

Another RS1 (e.g., SSB or CSI-RS (e.g., CSI-RS for tracking)) that provides QCL information (or spatial relation information) of the RS may be considered. When the RS1 is a CSI-RS, another RS2 providing QCL information (e.g., QCL-Type2) of the RS1 may be considered. Repeating the above operation, an SSB providing QCL information of the RS1 may be identified. The terminal may assume that the QCL information of the RS is provided from a certain SSB, and may identify an SSB index referenced by the RS.

For example, when considering a CSI-RS, QCL-Type1 of the CSI-RS may be provided through a CSI-RS_1 (e.g., CSI-RS resource for tracking). QCL-Type1 of the CSI-RS_1 may be provided through an SSB index a. In the RS group, the CSI-RS, the CSI-RS_1, and the SSB index a may be interpreted as having similar beams.

In addition, when the CSI-RS is considered again, QCL-Type2 of the CSI-RS may be provided through a CSI-RS_2 (e.g., CSI-RS resource for tracking). QCL-Type2 of the CSI-RS_2 may be provided through an SSB index b. In the RS group, the CSI-RS, the CSI-RS_2, and the SSB index b may be interpreted as having similar beams.

The QCL information of the RS may be provided through a CSI-RS (e.g., CSI-RS for tracking) rather than an SSB. The terminal may determine a narrow Rx beam by using a downlink (DL) beam management procedure. In the DL beam management procedure, a CSI-RS (e.g., CSI-RS for tracking) may be received with the narrow Rx beam.

In order to represent the RS group, a CSI-RS resource indicator(s) (CRI(s)) as well as SSB index(es) may be utilized. Only QCL-Type2 may be utilized as QCL information corresponding to the RS group. Alternatively, both QCL-Type1 and QCL-Type2 may be utilized as QCL information corresponding to the RS group. Exemplary embodiments in which QCL-Type2 is utilized will be described below, but in the exemplary embodiments below, QCL-Type1 or 'QCL-Type1 and QCL-Type2' may be utilized instead of QCL-Type2.

Method 1.1-5: The SSB index or CRI (e.g., CRI for tracking) used to derive QCL information for the RS may be utilized as the identifier of the RS group.

Method 1.1-6: In Method 1.1 5, the QCL information may be QCL-Type2.

SSBs having different SSB indexes (e.g., SSB index a and SSB index b) may belong to different RS groups. Alternatively, one SSB index may be regarded as one RS group. Alternatively, the SSB index may be reused as a RS group identifier. Alternatively, a separate RS group identifier may be introduced. The above-described exemplary embodiment may be applied to a CRI in the same or similar manner.

In the beam management procedure, the base station may manage a TCI state of the RS as a valid value by using a MAC CE. When a RS group identifier is provided for one RS, the RS group identifier may be updated by MAC signaling.

Method 1.1-7: The RS group identifier for the RS may be changed using a MAC CE.

1.2 Method of Allocating Resources for Adjustment of an Incorrect Beam

In a communication system operating at a high frequency, RS(s) may be transmitted using a narrow beamwidth. In order to extend a signal coverage area, the RS may be transmitted using a narrow beamwidth. The beamwidth may be set based on a power. For example, the beamwidth may be set to have a power of 3 dB.

In order to secure a coverage area using a narrow beamwidth, many RS resources may be required. The coverage area may refer to a geographic area in which information essential for operating the communication system (e.g., system information, common control information, and/or the like) achieves a predetermined error rate. For example, when a specific aggregation level of control channel elements (CCEs) is assumed for a PDSCH including a SIB1 or a PDCCH using a CSS set, an error rate of the PDSCH or PDCCH obtained by the terminal may be measured as a value below a predetermined threshold.

A terminal operating in an RRC connected state may perform a beam management procedure with the base station. The base station may intensively transmit RSs that the terminal is easy to receive. For example, the base station may transmit the RSs intensively in RS resources having a low error rate in the terminal (or RS resources having a good quality in the terminal). A terminal operating in an RRC idle state or an RRC inactive state may not perform a beam management procedure with the base station. It may be difficult for the base station to determine whether the terminal operating in the RRC idle state or RRC inactive state camps on a cell of the corresponding base station. In order to uniformly provide a SIB1 or GC-DCI in the coverage area, many RS resources may be required.

The base station may configure or indicate many RS resources to the terminal by using RRC signaling. The terminal may perform a measurement operation on all or some of the RS resources configured by the base station. Some RS resources among the RS resources configured by the base station may be activated, and the terminal may perform a measurement operation on the activated RS resources.

The narrow Rx beam may be managed to widen the coverage area. In this case, when the terminal moves or rotates, the Rx beam may be changed quickly in the Rx panel.

In this case, the base station may change a TCI state (or QCL state) utilized in beam management. When using a narrow Rx beam, since many RSs (e.g., many RS resources) are managed by the base station, even when QCL state(s) of some RSs is changed, a burden of signaling of the QCL state information (e.g., TCI state information) may be large.

When the TCI state (or QCL state) is changed by MAC signaling, the base station may schedule a PDSCH for transmission of the MAC signaling to the terminal. When the TCI state (or QCL state) is changed by PHY signaling, the base station may schedule a DCI for transmission of the PHY signaling to the terminal. If scheduling for the MAC signaling or the PHY signaling is delayed, it may be determined that the Rx beam for receiving the RS s is invalid.

As a method for solving the above-described problem, the base station may manage the Rx beam for the terminal, and may assume that the beam management procedure is incomplete. In order to reduce a PDSCH error rate at the terminal, resource(s) for re-adjusting the Rx beam may be added.

Method 1.2-1: In a PDSCH reception procedure, the terminal may assume an additional time for adjustment of the Rx beam of the terminal.

The base station may determine a Tx beam applied to a PDSCH. The terminal may properly select a Rx beam, and may receive a PDSCH using the selected Rx beam. When the base station uses the Tx beam and the Rx beam determined in the beam management procedure, additional Rx beam adjustment in the terminal may be unnecessary.

In consideration of the mobility of the terminal, if the Tx beam and/or the Rx beam cannot be reused as it is, a Tx beam or Rx beam having little relevance to the beam management procedure may be utilized. In this case, Method 1.2-1 may be applied, and it may be preferable for the terminal to perform additional Rx beam adjustment.

The adjustment operation of the Rx beam may be performed using one or more symbols. In symbol(s) in which the Tx beam remains the same, the terminal may select one best Rx beam by performing an experimental operation (e.g., measurement operation) on a plurality of Rx beams.

The terminal may select a Rx beam and may receive a PDSCH DM-RS through the selected Rx beam. In exemplary embodiments, a PDSCH DM-RS may mean a DM-RS used for transmission and reception of a PDSCH. The PDSCH DM-RS may be located within a PDSCH resource. The terminal may identify QCL-Type1 among QCL information for receiving the PDSCH based on a TCI state index included in a scheduling DCI. The terminal may roughly identify QCL-Type2 through the beam management procedure. When Method 1.2-1 is applied, the terminal may perform fine beam adjustment before receiving the PDSCH. Thereafter, the terminal may estimate a channel using the PDSCH DM-RS, and may perform demodulation and decoding on the PDSCH based on a result of the channel estimation.

The DL operation described above may be applied to a UL operation. The base station may configure or indicate a Tx beam to the terminal, and the terminal may transmit a PUSCH to the base station using the corresponding Tx beam. The base station may perform an additional beam management procedure for adjusting a Rx beam.

Method 1.2-2: In a PUSCH transmission procedure, the terminal may consider an additional time for adjustment of the Rx beam of the base station.

A DL beam adjustment procedure and a UL beam adjustment procedure may be performed. In exemplary embodiments, the beam adjustment procedure may refer to a beam management procedure. For example, the beam management procedure may include the beam adjustment procedure. The DL beam adjustment procedure may be divided into P1, P2, and P3, and the UL beam adjustment procedure may be divided into U1, U2, and U3. P1 and U1 may refer to procedures for roughly matching beams between the terminal and the base station. P1 may refer to a procedure in which the terminal identifies a Rx beam using an SSB. U1 may refer to a procedure in which the base station identifies a Rx beam using a physical random access channel (PRACH) preamble. In P1, the base station may transmit an SSB using an appropriate Tx beam, and in U1, the terminal may transmit a PRACH preamble using an appropriate Tx beam. A link (e.g., a pair of the Tx beam and the Rx beam) in each of P1 and U1 may not be optimized. After P1 and U1, a procedure for selecting a link having good quality (e.g., reference signal received power (RSRP) or signal to interference plus noise ratio (SINR)) may be performed.

P2 and U2 may be procedures performed by the base station. In P2, the base station may perform a measurement operation on several Tx beams while the terminal maintains the Rx beam in order to adjust the Tx beam of the base station. That is, the base station may transmit a signal to the terminal using several Tx beams. A plurality of symbols may be used in P2. When a beam report (e.g., a measurement result of the signal) is received from the terminal, the base station may select an appropriate Tx beam based on the beam report. In U2, the base station may perform a measurement operation on several Rx beams while the terminal maintains the Tx beam in order to adjust the Rx beam of the corresponding base station. A plurality of symbols may be used in U2. The base station may select an appropriate Rx beam based on the measurement result.

P3 and U3 may be procedures performed by the terminal. In P3, the terminal may perform a measurement operation on several Rx beams while the base station maintains the Tx beam in order to adjust the Rx beam of the corresponding terminal. A plurality of symbols may be used in P3. The terminal may select an appropriate Rx beam based on the measurement result. In U3, the terminal may perform a transmission operation on several Tx beams while the base station maintains the Rx beam in order to adjust the Tx beam of the corresponding terminal. That is, the terminal may transmit a signal to the base station using several Tx beams. One or more symbols may be used in U3.

The base station may configure or indicate a reception operation of the terminal using one or more symbols and/or a transmission operation of the terminal using one or more symbols by using RRC signaling. A link obtained through the beam adjustment procedure may be used in a CSI measurement operation and/or a data transmission operation.

When the speed of the terminal is fast and/or when a narrow beam is used, the link (e.g., optimal link) may be changed even when the beam adjustment procedure (e.g., beam management procedure) is performed. The optimal link may refer to an optimal pair of a Tx beam and an Rx beam. The terminal may perform an additional procedure to correct an incorrect link.

Method 1.2-3: After performing P1, P2, and P3 in Method 1.2-1, P3' may be further performed. P3' may be performed before reception of the PDSCH.

Method 1.2-4: After performing U1, U2, and U3 in Method 1.2 2, UT or U3' may be further performed. UT or U3' may be performed before transmission of the PUSCH.

The scheduling DCI may include an information element indicating whether there is a period (e.g., beam adjustment period) for adjusting the Rx beam. The scheduling DCI may indicate whether the beam adjustment period is activated. Information on the position and/or the size (e.g., time resource, frequency resource) of the beam adjustment period may be indicated to the terminal by higher layer signaling. The information on the position and/or the size of the beam adjustment period may be configuration information of the beam adjustment period. The scheduling DCI may include downlink scheduling information or uplink scheduling information. For example, in DL communication (e.g., PDSCH transmission procedure), the base station may inform the terminal that the beam adjustment period exists using the scheduling DCI, and the terminal may adjust the Rx beam in the beam adjustment period. The beam adjustment period may belong to the PDSCH (e.g., PDSCH resource). The base station may transmit an additional signal to the terminal to support the Rx beam adjustment of the terminal. That is, the base station may transmit an additional signal (e.g., RS or initial signal) to the terminal in the beam adjustment period. The terminal may adjust the Rx beam using the additional signal received in the beam adjustment period, and may perform a downlink reception operation using the adjusted Rx beam. The downlink reception operation may include a DM-RS reception operation and/or a DL data reception operation.

For example, in UL communication (e.g., PUSCH transmission procedure), the base station may adjust the Rx beam in the beam adjustment period. The beam adjustment period may belong to the PUSCH (e.g., PUSCH resource). The terminal may transmit an additional signal to the base station to support the Rx beam adjustment of the base station. That is, the terminal may transmit an additional signal (e.g., RS or initial signal) to the base station in the beam adjustment period. The base station may adjust the Rx beam using the additional signal received in the beam adjustment period, and may perform an uplink reception operation using the adjusted Rx beam. The uplink reception operation may include a DM-RS reception operation and/or a UL data reception operation.

In a configured grant (CG)-based communication procedure, the base station may transmit information on the beam adjustment period to the terminal using RRC signaling and/or activating DCI. In exemplary embodiments, the information on the beam adjustment period may include information indicating whether the beam adjustment period exists and/or information indicating the position and/or the size of the beam adjustment period. For example, in a transmission procedure of a semi-persistent scheduling (SPS) PDSCH (or, type1 CG PUSCH, type2 CG PUSCH), the base station may transmit configuration information including information of the beam adjustment period of the SPS PUSCH (or Type1 CG PUSCH, Type2 CG PUSCH) to the terminal. In a transmission procedure of an SPS PDSCH (or Type2 CG PUSCH), the base station may use a DCI (e.g., activating DCI) that activates SPS PDSCH transmission to inform the beam adjustment period (e.g., presence or activation of the beam adjustment period) to the terminal. In this case, in the same or similar manner to the scheduling DCI, the information of the beam adjustment period may be given to the terminal using the activating DCI.

Figure 3:
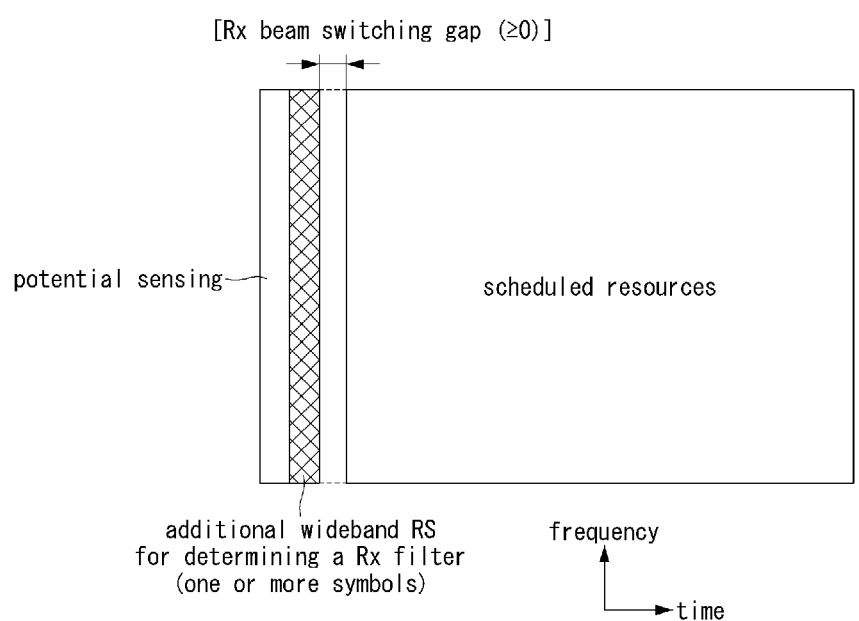
FIG. 3 is a conceptual diagram illustrating a first exemplary embodiment of a beam adjustment period.

FIG. 3 is a conceptual diagram illustrating a first exemplary embodiment of a beam adjustment period.

Referring to FIG. 3, a sensing procedure may not be performed in a licensed band, but a sensing procedure may be performed in an unlicensed band according to frequency regulation. Alternatively, when it is determined that a sensing procedure is unnecessary according to frequency regulation in the unlicensed band, the sensing procedure may be omitted. A time of calculation for changing the Rx beam and/or a time for changing the Rx beam may be additionally required. The beam adjustment period may correspond to a period of (interval for potential sensing+interval for additional wideband RS transmission to determine Rx filter+Rx beam switching gap) or a period of (interval for additional wideband RS transmission to determine Rx filter+Rx beam switching gap). The Rx beam switching gap may be a time required for switching of the Rx beam.

1.3 Method of Generating an Initial Signal

In a downlink communication procedure, the base station may transmit an initial signal. The terminal may receive the initial signal and may adjust the Rx beam based on the initial signal. In an uplink communication procedure, the terminal may transmit an initial signal. The base station may receive the initial signal and may adjust the Rx beam based on the initial signal. The initial signal may be transmitted/received in the beam adjustment period. Additional processing time to adjust the Rx beam may be required. The reason is that a predetermined processing time is required from a time of demodulating the initial signal to a time of determining the most appropriate Rx beam.

Method 1.3-1: The time for Rx beam adjustment may correspond to symbol(s) preceding the PDSCH (or PUSCH) (e.g., symbol(s) in which the initial signal is received).

The initial signal (e.g., additional wideband RS) shown in FIG. 3 may be considered. When a communication node (e.g., base station or terminal) operates in an unlicensed band, the communication node may perform a listen-before-talk (LBT) procedure, and may access a channel based on a result of performing the LBT procedure. The operations after channel access in the unlicensed band may be the same as or similar to the operation in the licensed band.

Method 1.3-2: In Method 1.3-1, the last symbol in which the initial signal is transmitted and the first symbol of the PDSCH may not be contiguous.

When the communication node operates in an unlicensed band, it may be preferable that the initial signal and the PDSCH (or PUSCH) are transmitted consecutively. In this case, an additional LBT procedure for receiving the PDSCH may be required in order to configure (or secure) a predetermined processing time. In order to support the above-described operation, the base station (or terminal) may additionally transmit an initial signal. However, the additionally-transmitted initial signal may not need to be received by the terminal (or base station).

Method 1.3-3: In Method 1.3-1, the last symbol in which the initial signal is transmitted and the first symbol of the PDSCH (or PUSCH) may be contiguous, and the communication node (e.g., base station or terminal) may not perform a reception operation in the last symbol(s) (e.g., an interval including the last symbol).

Hereinafter, a subcarrier spacing of the initial signal will be described.

A subcarrier spacing of the initial signal (e.g., a resource through which the initial signal is transmitted) may be the same as a subcarrier spacing of the PDSCH (or PUSCH). Alternatively, the subcarrier spacing of the initial signal may be larger than the subcarrier spacing of the PDSCH (or PUSCH). For the Rx beam adjustment, the terminal (or base station) may perform an experimental operation (e.g., measurement operation) on a plurality of Rx beams, and a plurality of symbols may be required to support the above-described operation. When a plurality of symbols are required for the Rx beam adjustment, time resources may be used inefficiently. Even when a plurality of symbols are required, in order to efficiently use time resources, symbol(s) used for the initial signal may have a large subcarrier spacing.

Hereinafter, an antenna port of the initial signal will be described.

The initial signal may have one or more antenna ports. The number of antenna ports of a DM-RS may be determined according to a need for scheduling single-user (SU) MIMO or multi-user (MU) MIMO. Since the antenna port(s) of the initial signal are used to adjust the Rx beam, the number of antenna port(s) of the initial signal may be limited to one or two. Alternatively, the number of antenna port(s) that the initial signal has may be limited to the number of Rx panels.

Method 1.3-4: The antenna port of the initial signal may be the same as one of the antenna port(s) of the DM-RS.

The antenna port of the initial signal may be associated with the antenna port(s) of the PDSCH DM-RS. For example, the antenna port of the initial signal may be the same as the antenna port having the lowest index among the antenna ports of the PDSCH DM-RS. For example, a specific antenna port among the antenna ports of the PUSCH DM-RS may be selected based on the association information indicated in the DCI, and the selected specific antenna port may be the same as the antenna port of the initial signal.

Method 1.3-5: The antenna port of the initial signal may be the same as one of the antenna port(s) of the phase tracking (PT)-RS.

The antenna port of the initial signal may be associated with the antenna port(s) of the PT-RS. For example, the antenna port of the initial signal may correspond one-to-one with the antenna port of the PT-RS. The number of antenna port(s) of the initial signal may be the same as the number of antenna port(s) of the PT-RS.

Hereinafter, a shape of resource elements (REs) of the initial signal will be described.

Method 1.3-6: The initial signal may have the same mapping as the DM-RS.

Information on a sequence of the DM-RS may be divided into initialization information, phase information, and the like.

The initialization information and/or phase information may be determined by a function of time (e.g., slot index, symbol index). The sequence may be determined according to time information of the initial signal. When the initialization information is utilized, DM-RS symbol(s) may be determined as QPSK symbol(s) to which a Gold sequence is mapped.

When the phase information is utilized, DM-RS symbol(s) may be determined as QPSK symbol(s) to which a ZC sequence or a specific sequence presented in the technical specification is mapped. In exemplary embodiments, the DM-RS symbol(s) may refer to symbol(s) to which the DM-RS is mapped.

Method 1.3-7: In Method 1.3-6, the first DM-RS symbol may be duplicated, and the duplicated first DM-RS symbol may be used as the initial signal. The duplicated first DM-RS symbol may be mapped to resource(s) (e.g., RE(s)) as the initial signal.

When two or more DM-RS symbols are generated, the first DM-RS symbol among the two or more DM-RS symbols may be used as the initial signal. When the initial signal consists of two or more symbols, the duplicated DM-RS symbols may be successively mapped to the resources. For example, the duplicated first DM-RS symbol may be successively mapped to the two or more symbols for the initial signal. Alternatively, the duplicated first DM-RS symbol and the duplicated second DM-RS symbol may be successively mapped to two symbols for the initial signal.

Method 1.3-8: In Method 1.3-6, the first DM-RS symbol having an extended cyclic prefix (CP) may be used as the initial signal.

When the initial signal is composed of two or more symbols, a CP of the first DM-RS symbol may be extended, and the extended CP may be mapped to the resources for the initial signal by a required length. The base station may indicate or set the number of symbols of the initial signal to the terminal by using RRC signaling. Alternatively, the base station may indicate or set candidate numbers of symbols of the initial signal to the terminal using RRC signaling, and may inform the terminal of an identifier or index indicating one number among the candidate numbers by using a DCI.

When a ZC sequence or a specific sequence presented in the technical specification is used as a sequence of the DM-RS in UL communication, QPSK modulation for the DM-RS may be performed without performing inverse fast Fourier transform (IFFT) or inverse discrete Fourier transform (IDFT).

Method 1.3-9: In Method 1.3-6, the time information applied to the procedure of generating the sequence of the initial signal may be time information suitable for symbol(s) corresponding to the initial signal.

When Method 1.3-7 or Method 1.3-8 is applied, the symbol(s) of the initial signal may be derived from the DM-RS symbol(s). When Method 1.3-9 is applied, the symbol(s) of the initial signal may be interpreted as generating other DM-RS symbol(s). Information other than the sequence information of the first DM-RS symbol may be reused. For example, a code division multiplexing (CDM) group index and a CDM index (or orthogonal cover code (OCC) value) of the first DM-RS symbol may be used as they are.

Method 1.3-10: The sequence of the initial signal may be determined, and transform precoding and IFFT (or inverse discrete Fourier transform (IDFT)) on the initial signal may be sequentially performed.

In order to efficiently use time resources (e.g., beam adjustment period) for the Rx beam adjustment, if transform precoding is applied after interleaved mapping, the signal may be repeated in the time domain. That is, a waveform that is temporally repeated in one symbol may be generated.

For example, the base station may inform the terminal of a value of N using RRC signaling or a combination of RRC signaling and DCI. If a communication node (e.g., base station or terminal) performs transform precoding after performing interleaved mapping having an interval of N, N repeated signals may be received in one symbol period. In this case, the communication node (e.g., base station or terminal) may receive the corresponding symbol using N Rx beams. Thereafter, the communication node may apply FFT to the received signal, and may select one Rx beam having the best quality among the N Rx beams.

Physical resource blocks (PRBs) used for the interleaved mapping may be selected from among PRBs allocated for the PDSCH (or PUSCH).

1.4 Method of Receiving an Initial Signal

The TCI state may be indicated by an index in which QCL-Type1 information and QCL-Type2 information are combined.

The QCL-Type2 may correspond to an identifier of a RS providing QCL-TypeD. The QCL-Type2 may be indicated to the terminal based on information obtained through the DL beam management procedure (i.e., P1, P2, P3) between the base station and the terminal.

In a PDSCH transmission procedure, the base station may indicate to the terminal one of a plurality of TCI state indexes configured by RRC signaling by using a scheduling DCI or an activating DCI.

In a PUSCH transmission procedure, the base station may indicate to the terminal one of a plurality of TCI state indexes configured by RRC signaling by using a scheduling DCI or an activating DCI. In a non-codebook-based PUSCH transmission procedure, an SRI field included in a scheduling DCI or an activating DCI may indicate specific SRIs to the terminal.

When the terminal has a plurality of panels or when the terminal performs communication with a plurality of TRPs, TCI states may be expressed by one index. The terminal may perform a PDSCH reception operation and a PUSCH transmission operation with two or more TRPs in an SDM, FDM, and/or TDM manner based on information indicated by RRC signaling and/or DCI.

One TCI state (or SRI field) may refer to a pair of a Tx beam and an Rx beam for which the beam management procedure has been completed. The reason is that information conveyed by the TCI state is QCL-Type 1 providing QCL-TypeA.

Therefore, the terminal may not utilize a Tx beam and/or a Rx beam for which the beam management procedure has not been completed. When the terminal moves rapidly or when it is determined that the mobility of the terminal is high due to a rotation of the terminal, the base station may determine that the Tx beam and Rx beam of the terminal have a relatively wide beamwidth and the Tx beam and Rx beam of the base station have a relatively wide beamwidth. The beam management procedure may be completed in advance, but the coverage area may be limited.

The initial signal may be received through the same beam(s) or similar beam(s) as the Rx beam derived using the TCI state index (or the Tx beam derived using the SRI). In each of the base station and the terminal, the initial signal may be received through the same beam(s) or similar beam(s).

When time synchronization and frequency synchronization for Tx beams having the same transmission power are acquired (or the time synchronization and the frequency synchronization have an error smaller than a threshold) and the Tx beams undergo the same radio channel, Tx beams having a similar SINR (or similar RSRP, similar error rate for a reference PDSCH, similar error rate for a reference PDCCH) for the same Rx beam may be similar Tx beams.

When the Rx beams undergo the same radio channel, Rx beams having a similar SINR (or similar RSRP, similar error rate for a reference PUCCH, similar error rate for a reference PUCCH) for the same Tx beam may be similar Rx beams.

In a PDSCH reception procedure, the Rx beam applied by the terminal may be the same or similar beam as one of the Rx beam(s) indicated by the TCI state index. The Rx beam may be determined in the beam management procedure, and the proposed method may be different from the conventional method in which the Rx beam is not changed in the PDSCH reception procedure.

Method 1.4-1: When the terminal adjusts the Rx beam, the maximum number M1 of Rx beams testable (e.g., measurable) by the terminal may be signaled in advance to the terminal.

The base station may determine a value of M1 not to be greater than a predetermined number (M) in consideration of the capability of the terminal, and may inform the terminal of the value of M1. That is, M1 may be less than or equal to M. The value of M1 may be the number (e.g., the maximum number) of Rx beams usable for reception of the initial signal. The terminal may receive the initial signal, and may derive the number of symbols of the initial signal or the structure of the symbols based on the value of M1. Alternatively, the terminal may derive the value of M1 from the shape of the initial signal, and may test (e.g., measure) M1 or less Rx beams. The M1 or less Rx beams may be similar Rx beams.

The above-described method may be equally or similarly applied to the Rx beam of the base station in a PUSCH transmission procedure. For one of the Tx beams indicated to the terminal by the SRI(s) (or TCI state index(es)), the Rx beam applied by the base station may be the same beam(s) or similar beam(s) as the Rx beam determined in the beam management procedure. A method modified from Method 1.4-1 may be applied to UL communication. The number of Rx beams that the base station tests may not be defined in the technical specification. The number of Rx beams tested by the base station may be estimated from the shape of the initial signal transmitted by the terminal. The terminal may perform a transmission operation for a sufficient time using the same Tx beam, and the base station may determine one Rx beam by testing a plurality of beams during the transmission time of the terminal. The plurality of Rx beams may be similar Rx beams.

In the procedure of testing the Rx beams, the terminal may test arbitrary Rx beam(s) and/or some of Rx beams defined in the technical specification. The Rx beam(s) to be tested may include at least the Rx beam (e.g., Rx beam 1) obtained in the beam management procedure.

Method 1.4-2: In the procedure of adjusting the Rx beam of the terminal, the Rx beam to be adjusted may include at least the Rx beam 1.

When candidates for Rx beams are arbitrarily determined, it may be difficult for the terminal and the base station to predict a link quality (e.g., error rate, SINR, RSRP). When the Rx beam 1 is used, the mobility of the terminal may be limited with respect to an MCS determined by the base station. In this case, the communication node (e.g., base station and/or terminal) may predict that a predetermined error rate (e.g., 10%) may occur. However, the communication node may not know whether the Rx beam with a lower error rate is tested.

In exemplary embodiments, the determined Tx beam may be expressed as forming a grid of beams (i.e., beam grid). The beam grid may be composed of a plurality of beam elements. One beam element may correspond to one Rx beam. It may be assumed that the terminal uses an array antenna, and the base station may indicate or set the size of the beam grid to the terminal. The terminal may perform a measurement operation on the Rx beam(s) belonging to the beam grid in the beam adjustment period.

Method 1.4-3: The beam grid may be expressed in one dimension or two dimensions according to the shape of the array antenna of the terminal.

The base station may set or indicate to the terminal a value for deriving the size of the beam grid using RRC signaling. The relationship between the Rx beam 1 and the beam grid may be specified.

Method 1.4-4: In Method 1.4-3, the Rx beam 1 may be one of the beam elements belonging to the beam grid.

Method 1.4-5: In Method 1.4-3, the Rx beam 1 may be a value representative of the beam grid, and the Rx beam 1 may not necessarily be a beam element belonging to the beam grid.

When a one-dimensional beam grid is used, the base station may set or indicate one value (e.g., M2) to the terminal. The terminal may experiment one or more Rx beams using the initial signal based on the Rx beam 1. The value of M2 may be derived from the maximum number of antenna ports applicable to a PUSCH. The value of M2 may be derived from M1 applied to the shape of the initial signal.

Figure 4:
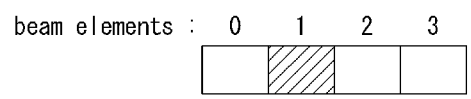
FIG. 4 is a conceptual diagram illustrating a first exemplary embodiment of a one-dimensional beam grid.

FIG. 4 is a conceptual diagram illustrating a first exemplary embodiment of a one-dimensional beam grid.

Referring to FIG. 4, M2 of the one-dimensional beam grid may be 4. The terminal may interpret the Rx beam 1 and beams similar to the Rx beam 1 as one beam grid. The beam grid may include a beam element 0, a beam element 1, a beam element 2, and a beam element 3.

Based on Method 1.4-4, one beam element among beam elements included in the beam grid may correspond to the Rx beam1. According to a configuration of the base station, a beam element (e.g., beam element 1 or beam element 2) corresponding to the Rx beam 1 may be indicated by additional RRC signaling.

Based on Method 1.4-5, M2 different Rx beams may be derived using the Rx beam1.

When a two-dimensional beam grid is used, the base station may set or indicate to the terminal a value for the first direction (e.g., M21) and a value for the second direction (e.g., M22). The terminal may experiment one or more Rx beams using the initial signal based on the Rx beam 1. Each value of M21 and M22 may be derived from the maximum number of antenna ports applicable to a PUSCH or the shape of the initial signal.

Figure 5:
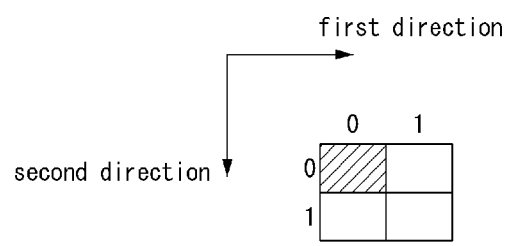
FIG. 5 is a conceptual diagram illustrating a first exemplary embodiment of a two-dimensional beam grid.

FIG. 5 is a conceptual diagram illustrating a first exemplary embodiment of a two-dimensional beam grid.

Referring to FIG. 5, in a two-dimensional beam grid, M21 may be 2, and M22 may be 2. The two-dimensional beam grid may be composed of M21×M22 beam elements. The two-dimensional beam grid may include a beam element 00, a beam element 01, a beam element 10, and a beam element 11.

According to Method 1.4-4, one beam element included in the two-dimensional beam grid may correspond to the Rx beam 1. According to a configuration of the base station, a beam element (e.g., beam element 00, beam element 01, beam element 10, or beam element 11) corresponding to the Rx beam 1 may be indicated by additional RRC signaling.

According to Method 1.4-5, M2 different Rx beams may be derived using the Rx beam1.

When the terminal moves or when the terminal rotates, if the Rx beam 1 is obtained by the conventional beam management procedure, a quality of the PDSCH may be degraded. To solve this problem, the initial signal may be additionally received. A method of additionally receiving the initial signal may be the same as Method 1.4-4 and Method 1.4-5.

A difference between Method 1.4-4 and Method 1.4-5 may occur in the case of changing the width of the Rx beam. Since the beam management procedure for the Rx beam 1 is completed, the Rx beam 1 may have a narrow width.

If Method 1.4-4 is applied, candidates of Rx beams of the PDSCH may have a narrow width.

If Method 1.4-5 is applied, candidates of Rx beams of the PDSCH may have a narrow width or a wide width. That is, the candidates of Rx beams of the PDSCH may not be limited to a narrow width.

In a scheduling procedure of the PDSCH, the base station may determine not only the TCI state but also the MCS. The base station may assume that the Rx beam 1 is applied, and may derive the MCS based on the assumption.

If Method 1.4-4 is applied, a Rx beam predicted to have a lower error rate (or high SINR, high RSRP) than the Rx beam 1 of the PDSCH may be selected. A low error rate may be obtained for the corresponding MCS in the selected Rx beam.

If Method 1.4-5 is applied, since candidates of Rx beams of the PDSCH are variously tested, an Rx beam having a higher error rate (or lower SINR, lower RSRP) than the Rx beam1 may be selected. A high error rate may be obtained for the corresponding MCS in the selected Rx beam.

1.5 Signaling Method for an Initial Signal

When a beam adjustment period is indicated or configured to the terminal, a combination of the corresponding signaling and the signaling supported by the conventional technical specification may be used. For example, a signaling method of the beam adjustment period may be associated with a PT-RS transmission/reception method. The base station may use a DCI (or RRC signaling) to indicate or configure the PT-RS transmission/reception method to the terminal.

According to the conventional technical specification, an association relationship between a PT-RS antenna port and a DM-RS antenna port may be expressed differently in DL and UL. A DL PT-RS antenna port may be one of the DM-RS antenna ports. The above-described association relationship between the DL PT-RS antenna port and the DM-RS antenna port may be defined in the technical specification.

The base station may indicate or configure a relationship (e.g., association relationship) between a UL PT-RS antenna port and a DM-RS antenna port to the terminal using RRC signaling and/or DCI (e.g., scheduling DCI). The PT-RS transmission method when a codebook-based PUSCH is configured by RRC signaling may be different from the PT-RS transmission method when a non-codebook-based PUSCH is configured by RRC signaling.

In a non-codebook-based PUSCH transmission procedure, since information on a PT-RSs configured by an SRI, information indicating an SRI associated with a PUSCH DM-RS may be sufficient information for the terminal. In a codebook-based PUSCH transmission procedure, a relationship between a PT-RS antenna port and a UL layer, which is indicated by a transmit precoding matrix index (TPMI), may be indicated to the terminal by an additional field of a DCI. The relationship between the PT-RS antenna port and the PUSCH DM-RS antenna port may be determined in the technical specification.

When an initial signal is used in a beam adjustment period of a PUSCH, it may be preferable that an antenna port of the initial signal is associated with a UL layer and a PUSCH DM-RS. A scheme in which the PT-RS and the DM-RS are associated may be considered.

Method 1.5-1: The PT-RS antenna port may correspond one-to-one with the antenna port of the initial signal.

The antenna port of the initial signal may correspond to the antenna port of the PT-RS one-to-one, and the number of antenna ports of the initial signal and the number of antenna ports of the PT-RS may be the same. The antenna port of the PT-RS may correspond one-to-one with an antenna port having a high transmission power (or good reception quality) among the antenna ports of the PUSCH DM-RS. Since the initial signal is transmitted to adjust the Rx beam, it may be preferable for the antenna port of the initial signal to correspond to an antenna port having a high transmission power (or good reception quality).

Method 1.5-2: A combination of a PT-RS transmission/reception method and an initial signal transmission/reception method may be used.

The base station may use RRC signaling and/or DCI (e.g., scheduling DCI) to indicate or configure a PT-RS transmission method to the terminal. The PT-RS transmission method may be indicated by RRC signaling or a specific field included in the DCI. When both the PT-RS and the initial signal are transmitted, the PT-RS transmission method and the initial signal transmission method may be combined. The combination of the PT-RS transmission method and the initial signal transmission method may be expressed by an index or an identifier. A specific field included in the DCI (e.g., scheduling DCI) or RRC signaling may indicate the above-described index (or identifier).

A sum of transmission powers of the initial signal may be equal to a transmission power of the PUSCH. Even when the antenna ports of the initial signal correspond to some of the antenna ports of the PUSCH PT-RS on a one-to-one basis, the transmission power of the initial signal and the transmission power of the PUSCH may be different from each other.

Method 1.5-3: An extended CP and/or an LBT related signal for the PUSCH may be reused as the initial signal. Alternatively, a combination of the initial signal transmission/reception methods may be applied.

In an unlicensed band, the base station may indicate or configure a CP extension scheme to the terminal by using RRC signaling and/or DCI (e.g., scheduling DCI). A symbol with an extended CP may be used as an initial signal for adjusting the Rx beam. The CP extension scheme may be reused in a licensed band, and a symbol having an extended CP may be used as an initial signal.

The antenna port(s) of the initial signal may correspond to some of the antenna ports of the PUSCH DM-RS on a one-to-one basis. When the PUSCH DM-RS is the first symbol, the above-described exemplary embodiment may be easily applied. When PUSCH data is the first symbol, it may be difficult to apply the above-described exemplary embodiment.

A sum of the transmission powers of the initial signal may be equal to a transmission power of the PUSCH. Even when the antenna ports of the initial signal correspond to some of the antenna ports of the PUSCH DM-RS on a one-to-one basis, the transmission power of the initial signal and the transmission power of the PUSCH DM-RS may be different from each other.

Method 1.5-4: The initial signal may be transmitted/received in the beam adjustment period, and the base station may indicate or configure an initial signal transmission/reception method to the terminal by using RRC signaling and/or DCI (e.g., scheduling DCI). That is, the RRC signaling or the DCI may include a field indicating the initial signal transmission/reception method.

When the field of the DCI is set to a first value, the corresponding field may indicate that the beam adjustment period exists. Accordingly, the terminal may identify that the beam adjustment period exists based on the field set to the first value included in the DCI. In a PUSCH transmission procedure, the terminal may transmit an initial signal. In a PDSCH reception procedure, the terminal may receive an initial signal. The terminal may derive information on antenna port(s) of the initial signal (e.g., information on the number of the antenna port(s) or information on a sequence of the initial signal) or the number of symbols of the initial signal based on the value of the DCI field.

1.6 Method of Reducing the Amount of Beam Reporting

The terminal may perform a beam management procedure. In the beam management procedure, the terminal may measure RSRPs (or SINRs) for all RSs configured by RRC signaling. According to the conventional technical specification, the measured RSRPs (or SINRs) may be regarded as uplink control information (UCI). The terminal may receive some RS s at the same time. Measurement Information on the RS s simultaneously received may be included in one channel state information (CSI) report based on separate RRC signaling. The RS may be classified into a reference RS and other RS(s). The RSRP (or SINR) of the other RS may be expressed as a difference with respect to the RSRP (or SINR) of the reference RS. The terminal may report the RSRP (or SINR) of the other RS to the base station. The number of bits representing the RSRP (or SINR) of the other RS may be smaller than the number of bits representing the RSRP (or SINR) of the reference RS.

Figure 6:
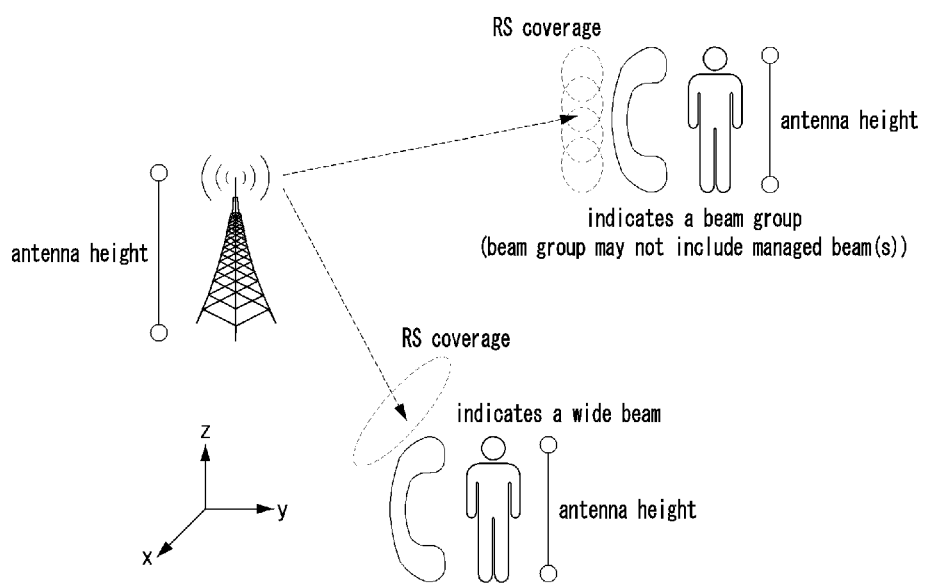
FIG. 6 is a conceptual diagram illustrating a first exemplary embodiment of a beam coverage area.
Figure 7:
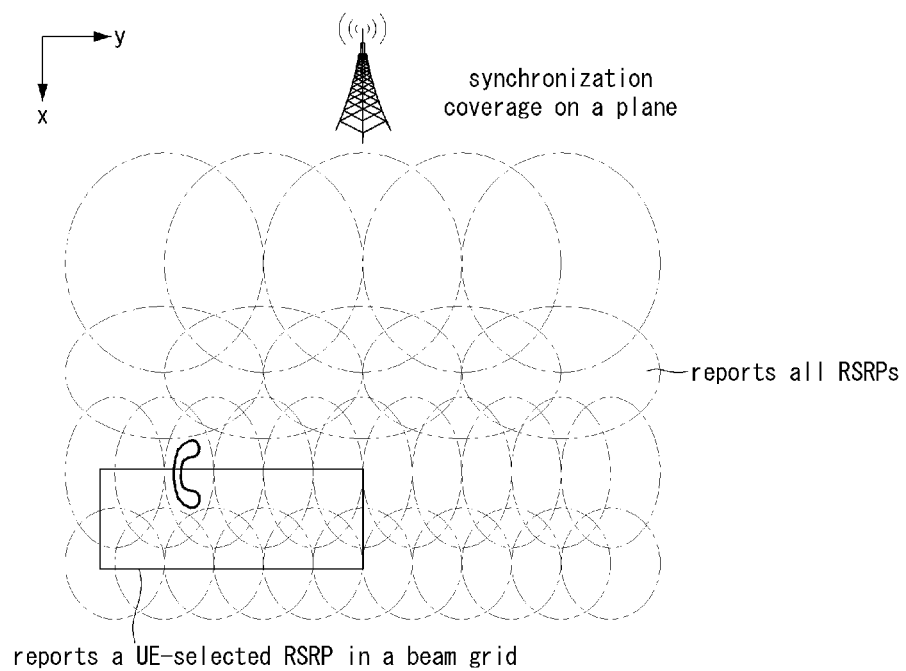
FIG. 7 is a conceptual diagram illustrating a second exemplary embodiment of a beam coverage area.

FIG. 6 is a conceptual diagram illustrating a first exemplary embodiment of a beam coverage area, and FIG. 7 is a conceptual diagram illustrating a second exemplary embodiment of a beam coverage area.

Referring to FIGS. 6 and 7, an area where the base station and the terminal are located may correspond to a beam coverage area. FIG. 6 may show the beam coverage area in a three-dimensional space, and FIG. 7 may show the beam coverage area (e.g., coverage area of a synchronization block (e.g., SS/PBCH block)) in a two-dimensional space. Since gains of a Tx beam and a Rx beam may be allowed to be small in a center region of a cell, the Tx beam and the Rx beam may have a wide beamwidth, and a beam coverage area thereof may correspond to a large circle. In order to increase gains of a Tx beam and a Rx beam in an edge region of the cell, the Tx beam and the Rx beam may have a narrow beamwidth, and a beam coverage area thereof may correspond to a small circle. A synchronization coverage may mean a coverage of the SSB.

When a plurality of beams having a narrow beamwidth are operated, the base station may configure many RSs in the terminal, the terminal may generate many CSI reports including measurement results for the many RSs, and the terminal may frequently transmit the CSI reports to the base station. Considering the mobility of the terminal, a burden of managing the beams having a narrow beamwidth may increase.

In order to solve the above-described problem, the terminal may reduce the number of times that the RS measurement operation is performed, and may reduce the amount of CSI reporting. The terminal may reduce the amount of bits indicating the RSRPs (or SINRs) for two or more RSs.

In a region in which beam(s) having a wide beamwidth are operated, the terminal may report RSRPs (or SINRs) for all RSs configured by the base station to the base station. In a region in which beam(s) having a narrow beamwidth are operated, the terminal may report one RSRP (or SINR) for the RSs configured by the base station or an RSRP (or SINR) for each of a part of the RSs configured by the base station to the base station.

Method 1.6-1: The terminal may measure an RSRP (or SINR) for each RS, may receive RRC signaling that configures or indicates a plurality of RSs, and may report one RSRP (or SINR) for the RS(s) configured by RRC signaling to the base station.

The plurality of RSs may be the aforementioned RS group. The plurality of RSs may be beam elements belonging to the aforementioned beam grid.

In order to reduce the amount of CSI reporting, according to Method 1.6-1, the terminal may derive one representative value from the plurality of RSRPs (or SINRs). The representative value may be an average value, a median value, a minimum value, or a maximum value therefor.

Alternatively, the terminal may select some RSRPs (or SINRs). According to the conventional technical specification, the terminal may select RS(s) having the largest RSRP (or SINR), and may report information on the selected RS(s) (e.g., identifier(s), RSRP(s), and/or SINR(s) of the RS(s)) to the base station by using RRC signaling. In the beam management procedure, the measurement result of the RS(s) may be reported to the base station as UCI, and the terminal may select RS(s) having the largest RSRP(s) (or SINR(s)).

Method 1.6-2: The terminal may measure an RSRP (or SINR) of each RS, and may report the largest RSRP (or SINR) to the base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:
1. A method of a terminal, comprising:
receiving, from a base station, downlink control information (DCI) including downlink scheduling information and information indicating that a beam adjustment period exists;
receiving, from the base station, an initial signal in the beam adjustment period;
adjusting a reception (Rx) beam of the terminal based on a measurement result of the initial signal; and
receiving, from the base station, data by using the adjusted Rx beam in a resource region indicated by the downlink scheduling information.

2. The method according to claim 1, further comprising receiving, from the base station, configuration information of the beam adjustment period, wherein the configuration information indicates at least one of a position or a size of the beam adjustment period.

3. The method according to claim 1, wherein the beam adjustment period is located before the resource region in time domain, and a last symbol in which the initial signal is received is not contiguous with a first symbol of the resource region.

4. The method according to claim 1, wherein the beam adjustment period is located before the resource region in time domain, a last symbol in which the initial signal is transmitted is contiguous with a first symbol of the resource region, and the terminal is not receive the initial signal in an interval including the last symbol.

5. The method according to claim 1, wherein a subcarrier spacing of a resource in which the initial signal is received is larger than a subcarrier spacing of the resource region.

6. The method according to claim 1, wherein an antenna port of the initial signal is associated with an antenna port of a demodulation-reference signal (DM-RS) or a phase tracking (PT)-RS.

7. The method according to claim 1, wherein the initial signal is received through similar Rx beams of the terminal, and the similar Rx beams are derived based on a transmission configuration indication (TCI) state index included in the DCI.

8. The method according to claim 1, further comprising receiving, from the base station, information indicating a number of Rx beams available for reception of the initial signal.

9. A method of a terminal, comprising:
  receiving, from a base station, downlink control information (DCI) including uplink scheduling information and information indicating that a beam adjustment period exists;
  transmitting, to the base station, an initial signal in the beam adjustment period; and
  transmitting, to the base station, data in a resource region indicated by the uplink scheduling information,
  wherein the initial signal is used for adjusting a reception (Rx) beam of the base station.

10. The method according to claim 9, further comprising receiving, from the base station, configuration information of the beam adjustment period, wherein the configuration information indicates at least one of a position or a size of the beam adjustment period.

11. The method according to claim 9, wherein the beam adjustment period is located before the resource region in time domain, and a last symbol in which the initial signal is transmitted is not contiguous with a first symbol of the resource region.

12. The method according to claim 9, wherein the beam adjustment period is located before the resource region in time domain, and a last symbol in which the initial signal is transmitted is contiguous with a first symbol of the resource region.

13. The method according to claim 9, wherein a subcarrier spacing of a resource in which the initial signal is transmitted is larger than a subcarrier spacing of the resource region.

14. The method according to claim 9, wherein an antenna port of the initial signal is associated with an antenna port of a demodulation-reference signal (DM-RS) or a phase tracking (PT)-RS.

15. A method of a base station, comprising:
  transmitting, to a terminal, downlink control information (DCI) including uplink scheduling information and information indicating that a beam adjustment period exists;
  receiving, from the terminal, an initial signal in the beam adjustment period;
  adjusting a reception (Rx) beam of the base station based on a measurement result of the initial signal; and
  receiving, from the terminal, data by using the adjusted Rx beam in a resource region indicated by the uplink scheduling information.

16. The method according to claim 15, further comprising transmitting, to the terminal, configuration information of the beam adjustment period, wherein the configuration information indicates at least one of a position or a size of the beam adjustment period.

17. The method according to claim 15, wherein the beam adjustment period is located before the resource region in time domain, and a last symbol in which the initial signal is received is not contiguous with a first symbol of the resource region.

18. The method according to claim 15, wherein the beam adjustment period is located before the resource region in time domain, and a last symbol in which the initial signal is transmitted is contiguous with a first symbol of the resource region.

19. The method according to claim 15, wherein an antenna port of the initial signal is associated with an antenna port of a demodulation-reference signal (DM-RS) or a phase tracking (PT)-RS.

20. The method according to claim 15, wherein the initial beam is received through similar Rx beams of the base station.

* * * * *